(12) United States Patent
Wirthmann

(10) Patent No.: US 8,061,902 B2
(45) Date of Patent: Nov. 22, 2011

(54) CORROSION-RESISTANT BEARING

(75) Inventor: Anton Wirthmann, Gemuenden (DE)

(73) Assignee: Bosch Rexroth AG, Stuttgart (DE)

( * ) Notice: Subject to any disclaimer, the term of this patent is extended or adjusted under 35 U.S.C. 154(b) by 524 days.

(21) Appl. No.: 12/067,317

(22) PCT Filed: Sep. 28, 2006

(86) PCT No.: PCT/EP2006/009412
§ 371 (c)(1),
(2), (4) Date: Jul. 15, 2008

(87) PCT Pub. No.: WO2007/036358
PCT Pub. Date: Apr. 5, 2007

(65) Prior Publication Data
US 2008/0292232 A1 Nov. 27, 2008

(30) Foreign Application Priority Data
Sep. 28, 2005 (DE) .......................... 10 2005 046 529
Dec. 24, 2005 (DE) .......................... 10 2005 062 243

(51) Int. Cl.
*F16C 27/00* (2006.01)
(52) U.S. Cl. .......................... 384/536; 384/493; 384/906
(58) Field of Classification Search .................. 384/493, 384/536, 557, 582, 905, 906
See application file for complete search history.

(56) References Cited

U.S. PATENT DOCUMENTS

| 2,324,676 | A | * | 7/1943 | Butterfield | 384/557 |
| 2,636,791 | A | | 4/1953 | Fischer | |
| 3,574,424 | A | | 4/1971 | Hegemeister | |
| 3,738,719 | A | * | 6/1973 | Langner | 384/517 |
| 4,046,432 | A | * | 9/1977 | Hofmann et al. | 384/906 |
| 4,226,485 | A | * | 10/1980 | Pruvot | 384/557 |
| 5,062,721 | A | * | 11/1991 | Chiba | 384/536 |
| 5,078,510 | A | * | 1/1992 | Bair et al. | 384/536 |
| 5,211,489 | A | * | 5/1993 | Moore | 384/585 |
| 6,250,815 | B1 | * | 6/2001 | Picone et al. | 384/557 |
| 6,513,988 | B2 | * | 2/2003 | Kurz | 384/905 |
| 2004/0239196 | A1 | * | 12/2004 | Miura et al. | 310/77 |

FOREIGN PATENT DOCUMENTS

| DE | 1 908 159 | 11/1969 |
| DE | 198 18 634 | 11/1999 |
| DE | 103 05 434 | 7/2004 |
| WO | 2005/042992 | 5/2005 |

* cited by examiner

Primary Examiner — Thomas R Hannon
(74) Attorney, Agent, or Firm — Michael J. Striker

(57) ABSTRACT

A floating bearing has a rotating, rotationally symmetric machine part (6), with an outer ring (10), which is non-rotatably supported in an intermediate bearing (1) that is located in the installation space of a housing (3, 8). An inner ring (11) is non-rotatably connected with the rotating machine part (6). A locking mechanism inhibits a relative motion in the circumferential direction between the housing (3, 8) and intermediate bearing (1) and permits a relative motion between the housing (3, 8) and intermediate bearing (1) along the rotation axis of the machine part (6).

12 Claims, 5 Drawing Sheets

FTM = Force Transmission Means

CORROSION-RESISTANT BEARING

BACKGROUND OF THE INVENTION

The present invention relates to a device for preventing fretting rust and the pounding-out of the bearing seat in motor systems, in the case of which a rotating radial load acts on the motor bearing, e.g., in the case of motors with a rigidly coupled load.

When electric motors are installed in machines, belts, pinions, or couplings may be used to transfer torque. In this case, the classic bearing load is a point load. With a very rigid coupling, a rotating radial load is generated, however. In most cases, the motor bearing becomes the first mechanical "weak point". The torque generated by the rotating load therefore acts on the bearing and/or its seat until the bearing is "pounded out" after a short period of time, and "fretting rust" forms.

Fretting rust is a type of fretting wear that occurs on contact surfaces and mating surfaces. Oscillations, fine vibrations, slippage, and loose fits result in a very high mechanical surface load, due to a combination of mechanical wear and cyclic stressing. The material surface becomes fatigued and activated, and a reaction takes place with the ambient medium (air, lubricants, water, etc.). In addition, conditions become favorable for the formation of microtears, which greatly reduces the fatigue limit of the material. Fatigue failure may therefore result.

Unexamined patent application DE 198 18 634 A1 discloses a floating bearing for spindles and shafts that is mounted via support elements in the bearing seat, using an intermediate bearing.

Due to the positioning of the bearing in the bearing seat using support elements, the bearing is hardly suited to absorbing rotating radial forces and, in applications with a rigid coupling of a load, in which rotating radial forces occur repeatedly, premature bearing seat wear would occur.

SUMMARY OF THE INVENTION

The object of the present invention is to provide a device of the type described initially, with which the mechanical damage that occurs to the bearing seat due to the rotating radial load is minimized or eliminated, and with which the formation of fretting rust and/or fretting corrision is prevented.

This object is attained by using a floating bearing for rotating machine parts, with an outer ring, which is non-rotatably supported in an intermediate bearing located in the installation space of a housing, and with an inner ring, which is non-rotatably connected with the rotating machine part, in the case of which locking means are included, which inhibit a relative motion in the circumferential direction between the housing and intermediate bearing, and permit a relative motion between the housing and intermediate bearing along the rotation axis of the machine part, the locking means being made preferably of a material with high corrosion resistance, in particular brass or stainless steel, and the intermediate bearing being made preferably of a plastic bushing in the housing.

With this means of attaining the object of the present invention, the bearing is fixed in position in the radial direction and in the circumferential direction, while movement in the axial direction to compensate for changes in length of the rotating machine part is prevented by thermal effects. The essential point is that the axial motion does not take place between the rotating machine part and the inner ring of the bearing, but rather between the housing and the intermediate bearing. A rigid connection between the rotating machine part and the inner ring is therefore always ensured. The floating bearing may be realized relatively easily and in a cost-favorable manner, fretting rust is prevented, and the springs, which provide preload between the motor housing and the bearing, are not also set into rotation.

Due to the preferred use of corrosion-resistant materials or alloys for the locking means, particularly brass or stainless steel, and due to the preferred use of a plastic bushing, preferably a polymer sliding bearing, a reaction between the material surfaces involved and the ambient medium (air, lubricants, water, etc.) is prevented, thereby also preventing fretting rust and premature wear. The basic idea is to avoid combining non-corrosion-resistant materials.

The floating bearing is typically realized as a roller bearing, with the outer ring representing the outer race, and the inner ring representing the inner race. The two rings are separated from each other via a rolling element (a ball, a cylindrical roller, a spherical roller, a barrel-shaped roller, a needle roller, or the like), which is located—in plurality—in a rolling element cage.

A rotating machine part is, e.g., a drive shaft that drives the rotation axis of a machine using a rigid connection (coupling, belt).

The intermediate bearing is understood to be, e.g., an annular bushing or the like, the inner diameter of which is suitable for fixedly accommodating the outer ring of the bearing, and the outer diameter of which is suitable for placement in an annular recess of the housing.

Preferably, the locking means, which were mentioned in context with the aforementioned floating bearing and which act in the circumferential direction, are realized using a mechanical guide in the axial direction (i.e., parallel with the rotation axis). The guidance in the axial direction automatically inhibits rotation.

Particularly preferably, the guidance is realized using a bore in the intermediate bearing and a bore in the housing, with a pin inserted in these bores preventing rotation, while axial motion is allowed.

As an alternative to the means of attaining the object of the present invention described above, the locking means are realized using a preferably form-fit toothing located on the housing and the intermediate bearing, and which ensure freedom of motion in the axial direction. The toothing may also be located on the end face of the intermediate bearing race, or it may be located on the outside, on the surface of the intermediate bearing race (outer toothing). A corresponding toothing would then be located on the respective opposite surfaces of the housing recess that accommodates the bearing.

A combination of the aforementioned means of attaining the object of the present invention for ensuring locking in the direction of rotation would also be feasible, e.g., spur toothing on the intermediate bearing in combination with a guide pin, or a spur toothing on the intermediate bearing in combination with a toothing located on the circumference of the intermediate bearing.

The present invention is preferably used in an electric motor, the shaft of which is equipped with a fixed bearing (on the B side, i.e., close to the rear wall of the motor housing), and a floating bearing (i.e., on the output side). The output-side drive shaft of the electric motor is supported using an inventive floating bearing supported in a flange. The floating bearing is located in a floating bearing bore located on the flange side. In this case, the bearing housing is realized via the flange and the bearing cover, with the locking mechanism being realized between the bearing cover and the intermediate bearing, or between the flange, bearing cover, and intermediate bearing. A change in length of the drive shaft is therefore compensated for only on the output side, so that any changes in length that may occur in the immediate vicinity of the fixed bearing located on the B side would not have negative consequences for this fixed bearing or any additional components located here and on the shaft. In addition, fretting rust is prevented, and the springs that are typically used to realize a preload between the motor shaft bearings are not also set into rotation. Rotating radial forces are absorbed by the floating bearing without impairing the bearing seat. As a further use of this application of the present invention, electric motors may be used as rigidly coupled direct drives without the bearings failing prematurely.

The present invention is preferably used with an electric motor with a motor brake located on the motor shaft, and/or with a motion data acquisition device located on the motor shaft. No design changes are necessary as a result of the present invention, because the brake may remain inside the motor housing at the point where it is typically located, i.e., on the B side (that is, in the direct vicinity of the fixed bearing). The same applies for the motion detection, e.g., a feedback unit for measuring rotational speed.

The reason for this is that the changes in length are minimal in the immediate vicinity of the fixed bearing, and they increase in proportion with the shaft length and, therefore, with the distance from the fixed bearing. Therefore, the further a component is from the fixed bearing, the greater the fluctuations of the shaft length are that must be compensated for.

The brake (holding brake and/or service brake) is typically composed of two components. One component is fixedly connected with the shaft, and a further component is fixedly connected with the housing. There is an air gap between the two components. During braking, the two components are intentionally pressed against each other. When the length of the shaft changes, this air gap decreases, and may even result in the components unintentionally becoming pressed together and, therefore, in a reduction in motor speed during normal operation. This may be prevented when the brake is installed as close to the fixed bearing as possible, which is still ensured using the present invention, and without any changes having been made to the overall design. Similar problems occur with bearings that include additional components such as motion data acquisition devices. Axial forces on the bearing may have disastrous consequences even when the length changes by 0.5 mm.

Very particularly preferably, the advantages of the present invention are realized with a machine, in particular a production machine, with the shaft being driven via the output of the aforementioned electric motor and with the aid of a force transmission means, e.g., a coupling or a drive belt. With a rigid coupling in particular, it must be expected that strong circumferential loads will act on the output side of the bearing of the electric motor. These loads lead to the destruction of the bearing seat, e.g., via fretting rust. The present invention reduces this risk and therefore increases the service life of the bearing. It also reduces the need for maintenance of the machine and/or the motor. The rigidity of the drive train is retained.

According to a further preferred embodiment of the present invention, the machine includes an electric motor without a housing, and the bearing is mounted in a bearing seat in the machine in which the motor is installed. The present invention is therefore optimized for use with standard motors and for housingless motors, which are becoming more and more popular.

The present invention will now be explained in greater detail with reference to an exemplary embodiment.

DETAILED DESCRIPTION OF THE PREFERRED EMBODIMENTS

Figure 1:
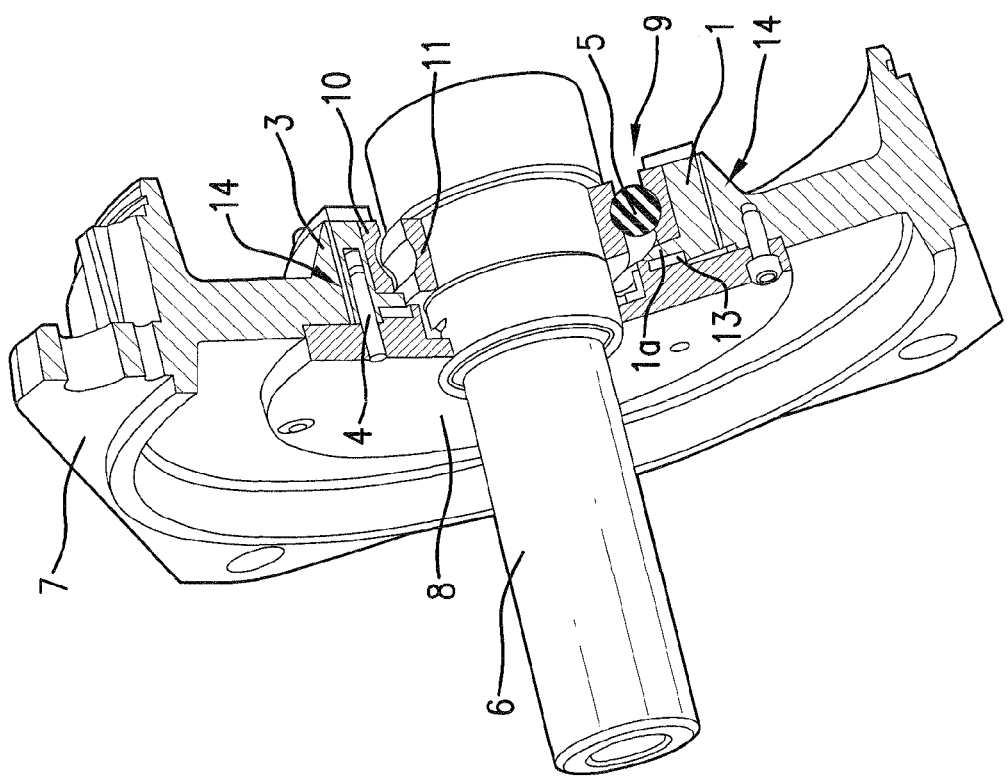
FIG. 1 shows a schematic representation of the bearing according to the present invention.
Figure 2:
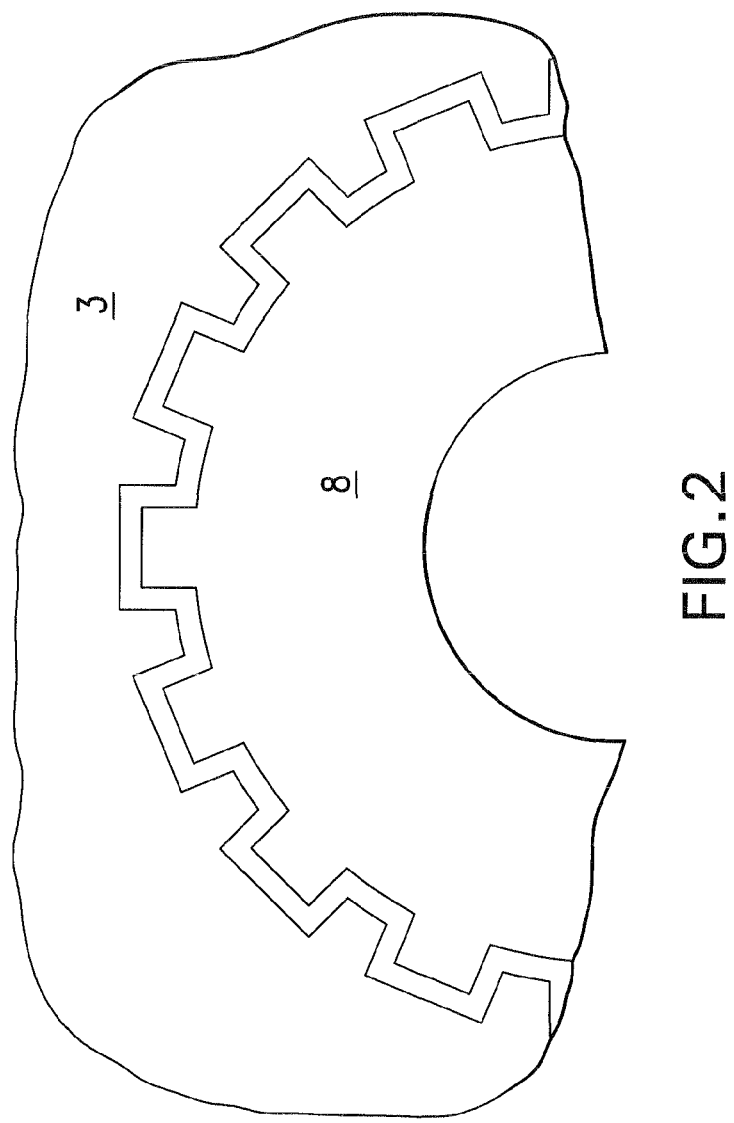
FIG. 2 shows an embodiment in which the locking means are realized as a form-fit toothing on the housing and the intermediate bearing.
Figure 3:
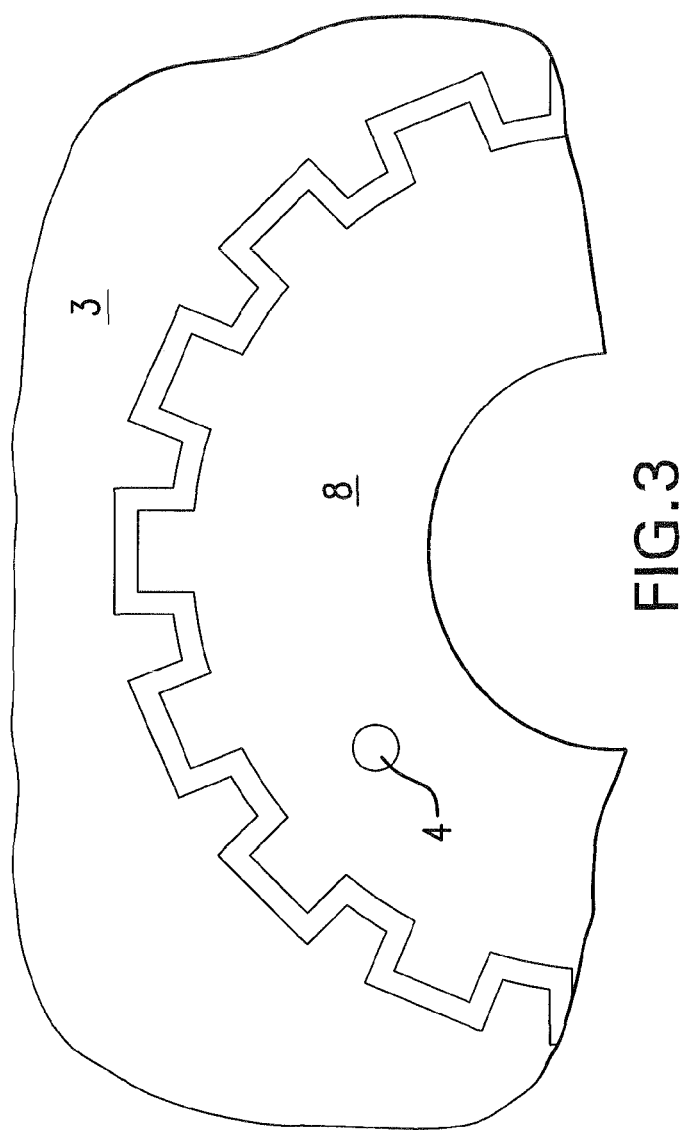
FIG. 3 shows an embodiment in the locking means are realized using a combination of using a bore in the intermediate bearing and housing and using a pin inserted in said bores, and using a form-fit toothing on the housing and the intermediate bearing.
Figure 4:
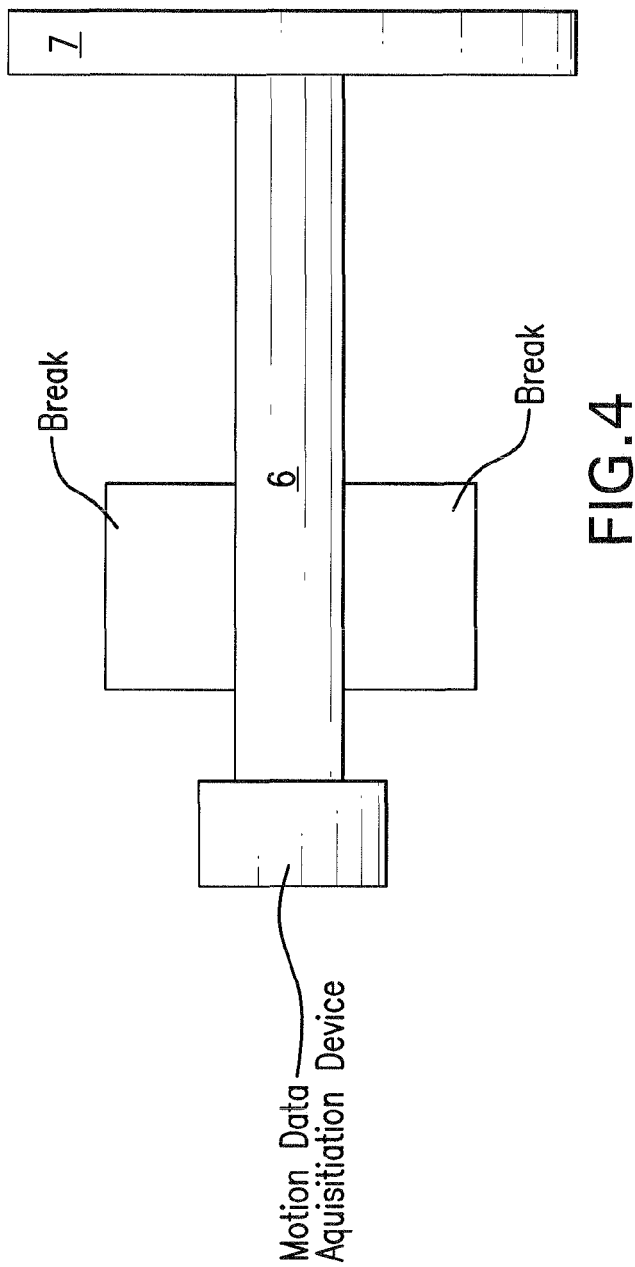
FIG. 4 shows the motor brake and/or a motion data acquisition device.
Figure 5:
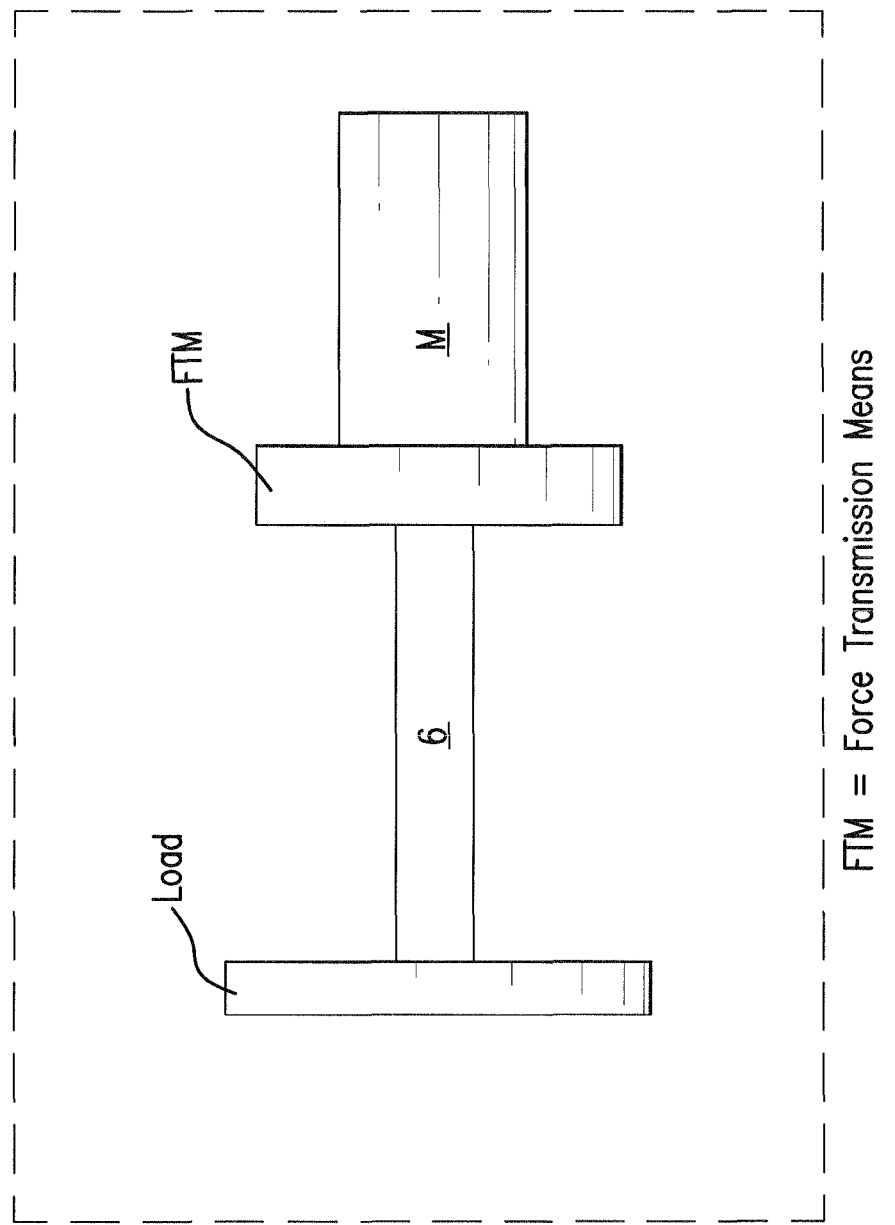
FIG. 5 shows a shaft of the production machine that is acted upon by circumferential loads and is driven via the output of an electric motor by a force transmission means.

FIG. 1 shows a schematicized depiction of a drive shaft 6, a bearing 9 composed of three mechanical components 5, 10, 11, and a housing, represented by components 3, 7, 8. Shaft 6 is supported radially by bearing 5, 10, 11. Bearing 5, 10, 11 is installed via an intermediate bearing 1 in bearing seat 3 of housing 7, 8, preferably using a plain bearing bush 14. Polymer plain bearing bush 14 is preferably pressed into housing 3, thereby preventing corrosion (fretting rust). Components 5, 10, and 11 form a roller bearing, inner ring 11 of which is non-rotatably supported on shaft 6, and outer ring 10 of which is fixedly mounted in intermediate bearing 1. Locking means 4 are provided to inhibit a relative motion between intermediate bearing 1 and bearing seat 3. A projection 1a is also shown, which is enclosed by intermediate bearing 1 and serves as a seat for pretensioning spring 13.

In applications where motor shaft 6 connected with a load is mechanically connected directly or via a very rigid coupling, it can happen that the load that is transferred to shaft 6 is neither stationary nor punctiform, but rather acts on all bearing components circumferentially. The rotating load causes a force that must be absorbed somewhere in the mechanical system, with the motor bearing or bearing seat 3 typically becoming the first mechanical "weak point". The torque generated by the rotating load is transferred to bearing 5, 10, 11 or its outer ring 10. When the torque exceeds the static frictional force between outer ring 10 of roller bearing 5, 10, 11 and bearing seat 3, outer ring 10 typically rotates relative to the housing. The present invention prevents this rotation and therefore protects the bearing seat without the need for a fixed bearing, because a fixed bearing would not compensate for an increase in length of the motor shaft, which would result in destruction of the mechanism. The present invention solves the problem in that it uses a fixed bearing that acts as a fixed bearing when radial loads occur.

Due to the means of attaining the object of the present invention shown here, pretensioning springs 13 are not set into rotation, which prevents additional material loads and increases the service life of the springs.

The inventive means of attaining the object of the present invention provides the machine builder with the advantage that no changes need be made to the mechanism. The advantage to the motor manufacturer is that standard components (e.g., economical roller bearings, ball bearings) may be used. In addition, no special tools or manufacturing processes are required, i.e., additional manufacturing costs are minimal, and the processes are limited to the working processes that are typical in machine engineering.

REFERENCE NUMERALS

1 Bushing
1a Projection
2 Cover
3 Bearing seat
4 Guide pin
5 Rolling element
6 Shaft
7 Flange
8 Bearing cover
9 Roller bearing with outer ring/inner ring/rolling elements
10 Outer ring
11 Inner ring
12 Electric motor
13 Pretensioning spring
14 (Preferably polymer) plain bearing bush

What is claimed is:

1. A floating bearing, comprising:
   a rotating, rotationally symmetric machine part (6);
   an outer ring (10) that is non-rotatably supported in an intermediate bearing (1) that is located in an installation space of a housing (3, 8);
   an inner ring (11) that is non-rotatably connected with the rotating machine part (6); and
   locking means configured to inhibit a relative motion in a circumferential direction between the housing (3, 8) and intermediate bearing (1) and to permit a relative axial motion between the housing (3, 8) and intermediate bearing (1) along a rotation axis of the machine part (6), wherein the intermediate bearing is located on the housing a plastic bushing so as to avoid combining non-corrosion-resistant materials.

2. The floating bearing as recited in claim 1, wherein the locking means include a brass or stainless steel material.

3. The floating bearing as recited in claim 1, wherein the locking means in the circumferential direction are realized using a mechanical guide that is parallel with the rotation axis.

4. The floating bearing as recited in claim 3, wherein the mechanical guide is realized using a bore in the intermediate bearing (1) and housing (3, 8), and using a pin (4) inserted in said bore.

5. The floating bearing as recited in claim 3, wherein the locking means are realized using a form-fit toothing on the housing (3, 8) and the intermediate bearing (1).

6. The floating bearing as recited in claim 3, wherein the locking means are realized using a combination of using a bore in the intermediate bearing (1) and housing (3, 8) and using a pin inserted in said bore, and using a form-fit toothing on the housing (3, 8) and the intermediate bearing (1).

7. The floating bearing as recited in claim 1, wherein the plastic bushing is a polymer sliding bearing.

8. The floating bearing as recited in claim 1, wherein the plastic bushing is pressed into the housing.

9. An electric motor with a drive shaft (6), wherein the shaft (6) is supported on an output side by using a floating bearing (9) installed in a recess in a motor flange (7), the floating bearing comprising:
   an outer ring that is non-rotatably supported in an intermediate bearing (1) that is located in an installation space of a housing (3, 8);
   an inner ring that is non-rotatably connected with the shaft (6); and
   locking means configured to inhibit a relative motion in a circumferential direction between the housing (3, 8) and intermediate bearing (1) and to permit a relative axial motion between the housing (3, 8) and intermediate bearing (1) along a rotation axis of the shaft (6), wherein the intermediate bearing is located on the housing a plastic bushing so as to avoid combining non-corrosion-resistant materials.

10. The electric motor as recited in claim 9, further including a motor brake and/or a motion data acquisition device.

11. A production machine, wherein a shaft of said production machine is acted upon by circumferential loads, wherein the shaft (6) is driven via the output of an electric motor, and with the aid of a force transmission means;
   wherein the shaft (6) is supported on an output side by a floating bearing (9) installed in a recess in a motor flange (7), the floating bearing comprising:
      an outer ring that is non-rotatably supported in an intermediate bearing (1) that is located in an installation space of a housing (3, 8);
      an inner ring that is non-rotatably connected with the shaft (6); and
      locking means configured to inhibit a relative motion in a circumferential direction between the housing (3, 8) and intermediate bearing (1) and to permit a relative axial motion between the housing (3, 8) and intermediate bearing (1) along a rotation axis of the shaft (6), wherein the intermediate bearing is located on the housing a plastic bushing so as to avoid combining non-corrosion-resistant materials.

12. A production machine according to claim 11, wherein said force transmission means is a coupling or a drive belt.

* * * * *